United States Patent [19]

Luz

[11] 3,767,967

[45] Oct. 23, 1973

[54] INSTANT-ON CIRCUITRY FOR AC/DC TELEVISION RECEIVERS

[75] Inventor: David Warren Luz, Indianapolis, Ind.

[73] Assignee: RCA Corporation, New York, N.Y.

[22] Filed: Nov. 24, 1971

[21] Appl. No.: 201,684

[52] U.S. Cl. .................................. 315/94, 315/101

[51] Int. Cl. .......................................... H05b 39/00

[58] Field of Search .................. 315/86, 94, 98, 101

[56] References Cited

UNITED STATES PATENTS 3,448,335 6/1969 Gregory et al. .................. 315/86 X

*Primary Examiner*—Nathan Kaufman
*Attorney*—Eugene M. Whitacre

[57] ABSTRACT

A single pole switching arrangement maintains the filament of the cathode-ray kinescope of a television receiver at full power when the set is turned to an "ON" condition and connected to an alternating current power source, but operates the filament at half power when the set is turned to its "OFF" state. When the receiver is connected to a direct current power source, on the other hand, no filament power is used when the single pole arrangement switches the set to its "OFF" condition, thereby extending the number of viewing hours between direct current battery recharges, for example. Switching the single pole arrangement to turn the receiver to its "ON" state when the set is connected to the direct current source once again applies full power to the kinescope filament.

5 Claims, 1 Drawing Figure

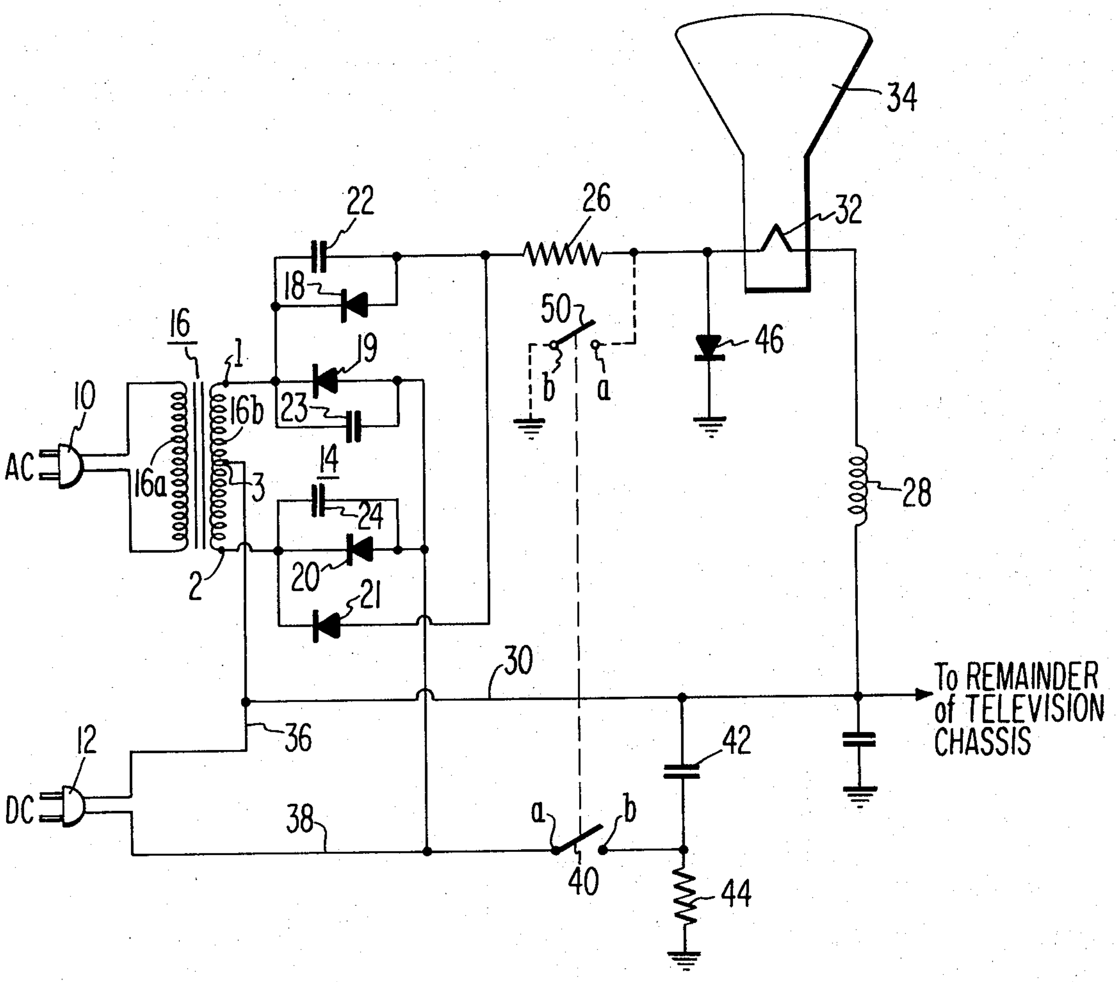
34
22
26
32
18
50
16
1
19
46
b
a
10
16b
23
AC
16a
14
3
28
24
2
20
21
30
To REMAINDER of TELEVISION CHASSIS
12
36
42
DC
38
a
b
40
44

INSTANT-ON CIRCUITRY FOR AC/DC TELEVISION RECEIVERS

FIELD OF THE INVENTION

This invention relates to solid state television receivers operable from either alternating or direct current power sources, in general, and to instant-on circuitry for use in such receivers, in particular.

SUMMARY OF THE INVENTION

As will become clear hereinafter, the construction of the invention provides an instant-on feature for the cathode-ray kinescope of the receiver when the set is connected to the alternating current power line, but removes this feature when the chassis is operated from a direct current power source, in order to prolong battery life, for example. In one preferred embodiment of the invention, a full-wave rectifier circuit, a filter capacitor, and a single pole switching arrangement are provided. When the receiver is connected to the alternating current power source and the set is turned to its "OFF" condition, the single pole switch disconnects the capacitor from the rectifier circuit to develop an average voltage at an output terminal of approximately seven-tenths the voltage that is there developed when the receiver is turned to its "ON" state, where the switch connects the filter capacitor to the full-wave circuit. Using this voltage to heat the kine-scope filament serves to operate the cathode-ray device when the set is "OFF" at approximately one-half the power as when the receiver is "ON". When the receiver is then turned from its "OFF" condition to its "ON" condition, the kinescope will rise to its full emission capability with a rapidity sufficiently close to that of the various signal processing stages of the receiver to warrant the "instant-on" characterization.

When the receiver is connected to a direct current power source, on the other hand, turning the set to its "ON" condition provides a closed circuit path through the single pole switch to include the kinescope filament, while placing the receiver in its "OFF" state open circuits that path, also through the control of the switch arrangement. No diminished power operation of the cathode-ray tube thus results to give "instant-on" control, but current drain is effectively reduced to extend the life between battery re-charges.

BRIEF DESCRIPTION OF THE DRAWING

These and other features of the present invention will be more clearly understood from a consideration of the following description taken in connection with the single FIGURE of the drawing showing a preferred embodiment of an instant-on circuit for an AC/DC solid state television receiver constructed in accordance with the invention.

DETAILED DESCRIPTION OF THE DRAWING

In the drawing, the alternating current power source is represented by the plug 10 whereas the direct current power source is represented by the plug 12. The plug 10 is adapted for connection to the 120 volt power main and provides an AC voltage to a rectifier circuit 14 by means of a step-down transformer 16. The plug 12, on the other hand, is adapted for connection to a 12 volt battery, for example via the cigarette lighter of an automobile having a 12 volt electrical system.

The rectifier circuit 14 includes four semi-conductor rectifiers 18–21, together with three capacitors 22–24 useful in reducing radio frequency transients produced during alternating signal switching operations. As indicated, the cathode electrodes of rectifiers 18 and 19 are connected together, and to the top terminal 1 of the transformer secondary winding **16*b*. Similarly, the cathode electrodes of rectifiers 20 and 21 are connected together to the bottom terminal 2 of winding 16b. The anode electrodes of rectifiers 18 and 21 are interconnected—as are the corresponding anode electrodes of rectifiers 19 and 20. Capacitors 22–24 are respectively coupled in parallel with rectifiers 18–20.**

Also shown in the drawing are a resistor 26, an inductor 28, and a connection 30 which serve to serially couple the opposite ends of the filament 32 of a cathode-ray kinescope 34 between the anode junction of rectifiers 18 and 21 and a center tap terminal 3 on the secondary winding 16b. Such center tap terminal 3 is also connected via a lead 36 to one prong of the battery plug 12, while a similar such lead 38 serves to connect the opposite prong of the plug to the anode junction of rectifiers 19 and 20. A single pole, single throw switch 40 is additionally shown, with one contact *a* connected to the lead 38 and with a second contact *b* coupled to one plate of an electrolytic capacitor 42. The opposite plate of capacitor 42 is connected to the center tap 3 of the secondary winding 16b via the lead 30, the capacitor 42 being in turn referenced to ground via a further resistor 44 coupled to switch contact *b*. Lastly, a semiconductor rectifier 46 is coupled with its anode electrode at the junction of resistor 26 and kinescope filament 32 and with its cathode electrode connected to ground.

Consider first the alternating current operation of the invention—that is, with the plug 10 connected to the AC power line. Rectifier circuit 14 will be seen to be a full-wave network which converts the alternating current voltage stepped-down by the transformer 16 into a unidirectional voltage at the anode junction of semiconductor devices 18, 21. When the receiver is to be switched to its "OFF" state, the single pole switch 40 is moved to its open condition—thereby disconnecting the filter capacitor 42 from the network 14 and causing the voltage to be developed at that anode junction to be of an RMS value approximately 0.707 times the voltage that would appear at that junction when switch 40 is closed to place the receiver in its "ON" state and to reinsert capacitor 42 into the circuit. This action of switch 40 thus serves to either remove or insert the filter capacitor 42 into the rectifier network, depending on whether the switch is opened or closed, respectively.

More specifically, in the "OFF" state of the receiver (i.e., with switch 40 opened), the coupling paths for the network 14 includes rectifiers 18 and 21, the upper and lower portions of secondary winding **16*b*, resistor 26, inductor 28, connecting lead 30 and kinescope filament 32. No conductive coupling of capacitor 42 to winding terminal 3 exists via rectifiers 19–20, however, because of the open circuit condition of switch 40. With the television receiver turned to its "ON" condition, on the other hand, capacitor 42 becomes coupled to the transformer winding 16b by way of lead 30 and these two rectifiers. The voltage developed at the anode junction of rectifiers 18 and 21 for this filtered case becomes correspondingly higher, so that by controlling the value of the voltage developed at this anode junction, the power which is applied to the filament 32 of kinescope 34 can be established, during "OFF" operation of the receiver, at essentially one half the power that would be applied during the "ON" operation. Maintaining the filament in this reduced condition enables the kinescope to then rise very rapidly to its full emission capability when the receiver is switched "ON" to provide seemingly "instant-on" operation of the cathode-ray reproducing device. In this configuration, resistor 26 is employed in series with the filament 32 as a voltage dropping resistor in order to insure proper kinescope operation, for example, under varying line voltage conditions. Inductor 28** is included for purposes of protecting the kinescope against arcing conditions.

Consider now the direct current operation of the switching arrangement—that is, with the plug 12 connected to a battery source and with the plug 10 disconnected from the AC power line. In the "OFF" condition of the receiver with the switch 40 in its open position, the circuit path including connecting lead 30, inductor 28, kinescope filament 32, rectifier 46, resistor 44 and lead 38 is open circuited by the switch 40. With the receiver in its "ON" position, on the other hand, the switch 40 completes this circuit path. Kinescope filament heating thus results with the closed position of the switch 40, but does not follow with the opening of the switch to shut-off the television receiver. Such operation of the kinescope without any filament heating in the "OFF" condition of the receiver thereby removes any instant-on characterization for the DC operation of the illustrated circuit, but offers the advantage instead that the current drain from the direct current power source will be substantially lessened. As a result, the period of television viewing between needed battery re-charges can be prolonged.

It will be readily apparent to one skilled in the art that rectifier 46 can be replaced by a second switch 50, shown in dotted lines, without changing the above described DC operation. More particularly, with one contact *a* of switch 50 connected to the junction between resistor 26 and kinescope filament 32 and with a second switch contact *b* being connected to ground, forward biasing of the rectifier 46 to complete the filament heating path through resistor 44 and switch 40 can be likewise effected by "ganging" the contact arm of the switch 50 to the contact arm of the switch 40. Closing the switch 40 then correspondingly closes the switch 50 to provide the complete circuit path when the receiver is set to its "ON" condition, to thereby apply the needed filament power. Opening the switch 40 correspondingly open circuits the switch 50 to break the filament heating path when the television chassis is turned to its "OFF" state.

It will also be apparent that the AC operation of the invention will be maintained if rectifiers 18 and 21 were removed from the illustrated circuit and resistor 26 were coupled to the anode electrode junction of the remaining rectifiers 19, 20. Positioning switch 40 in either an opened or closed position would continue to remove and insert, respectively, the filter capacitor 42 into the rectifier circuit 14—to thereby provide the developed voltage at resistor 26 used in establishing the different power conditions for heating the kinescope filament 32, as previously described. That is, with this modification, a direct voltage of 0.707 times the voltage that would be developed at the left hand terminal of resistor 26 when switch 40 is closed would additionally be developed there when switch 40 is opened, removing the filter capacitor 42 from the rectifier arrangement. However, with such arrangement—and during DC operation of the receiver with switch 40 opened—a complete circuit path would exist from one prong of battery plug 12 through kinescope filament 32 and resistor 26 to the other prong of that plug. In order to prevent the application of any direct voltage to the kinescope filament when the receiver is arranged for battery operation and the set is to be in its "OFF" state, separate rectifiers are needed. Thus, use of the rectifiers 19 and 20 with the resistor connection as illustrated serve in utilizing the rectifiers 19 and 20 to supply the filament standby voltage but to reverse bias and prevent the completion of a closed circuit during "OFF" operation in a DC mode.

While there has been described what is considered to be a preferred embodiment of the present invention, it will be readily appreciated that other modifications may be made without departing from the scope of the teachings herein.

What is claimed is:

1. In a television receiver, the combination comprising:

- a cathode-ray kinescope having a heater filament;
- first means for providing a source of alternating voltage;
- a full wave rectifier network coupled to said first means and responsive to the alternating voltage provided thereby for developing rectified direct voltages between a pair of output terminals of said network;
- second means coupling said network terminals between opposite ends of said kinescope filament along a filament coupling path for applying rectified direct voltages to energize said kinescope;
- a filter capacitor; and
- third means for switching said capacitor into said filament coupling path to filter the rectified direct voltages coupled for application to said cathode-ray kinescope when it is desired to operate said television receiver from said alternating voltage, and for switching said capacitor out of said coupling path to provide unfiltered rectified direct voltages for application to said cathode-ray kinescope when it is desired to de-energize said television receiver, whereby the value of unfiltered rectified direct voltages applied to said kinescope when said capacitor is switched out of said coupling path is less than the value of filtered rectified direct voltage applied to said kinescope when said capacitor is switched into said coupling path such that said filament operates at a first power from said alternating voltage when said capacitor is switched into said coupling path and operates at substantially half-power when said capacitor is switched out of said coupling path.

2. The combination of claim 1 wherein said first means includes a transformer having a secondary winding to which said rectifier network is coupled and a primary winding adapted for connection to a source of alternating power.

3. The combination of claim 2 wherein said rectifier network includes first and second rectifier devices having their anode electrodes interconnected and their cathode electrodes coupled to opposite terminals on said secondary winding, and wherein said second means couples said kinescope filament between an intermediate tap on said secondary winding and to said anode electrodes of said rectifiers.

4. The combination of claim 3 wherein said third means switches said filter capacitor in circuit between said intermediate tap and said anode electrodes when it is desired to operate said cathode-ray kinescope.

5. A power supply circuit for the filament of a cathode-ray kinescope comprising:

a first transformer winding providing an alternating current voltage and having first, second and third taps;

first, second, third and fourth rectifier devices, each having anode and cathode electrodes;

direct connections from the cathode electrodes of said first and second devices to said first tap on said transformer winding;

direct connections from the cathode electrodes of said third and fourth devices to said second tap on said transformer winding;

a direct connection between the anode electrodes of said first and fourth rectifier devices;

a direct connection between the anode electrodes of said second and third rectifier devices;

means coupling the filament of said cathode-ray kinescope between the anode electrode of said first rectifier and said third tap on said transformer winding;

a filter capacitor; and a single pole switching means which, in a closed position, couples said capacitor between the anode electrode of said second rectifier and said third tap on said secondary winding, and which forms a current coupling path including a portion of said transformer winding between said second rectifier anode and said third winding tap.

* * * * *